(12) United States Patent
Ganser

(10) Patent No.: US 9,137,288 B2
(45) Date of Patent: Sep. 15, 2015

(54) SCALABLE PUSH-BASED ARCHITECTURE FOR WEB APPLICATIONS

(75) Inventor: Klaus Ganser, El Paso, TX (US)

(73) Assignee: Yahoo! Inc., Sunnyvale, CA (US)

( * ) Notice: Subject to any disclaimer, the term of this patent is extended or adjusted under 35 U.S.C. 154(b) by 735 days.

(21) Appl. No.: 12/972,745

(22) Filed: Dec. 20, 2010

(65) Prior Publication Data

US 2012/0158825 A1 Jun. 21, 2012

(51) Int. Cl.
*G06F 15/16* (2006.01)
*H04L 29/08* (2006.01)
*G06F 17/30* (2006.01)

(52) U.S. Cl.
CPC ............ *H04L 67/02* (2013.01); *G06F 17/3089* (2013.01); *H04L 67/142* (2013.01)

(58) Field of Classification Search
USPC .................................. 709/203, 238, 242, 248
See application file for complete search history.

(56) References Cited

U.S. PATENT DOCUMENTS

| 2003/0237081 | A1* | 12/2003 | Taylor | 717/168 |
|---|---|---|---|---|
| 2009/0106391 | A1* | 4/2009 | Wang | 709/217 |
| 2010/0082540 | A1* | 4/2010 | Isaacson et al. | 707/624 |
| 2010/0161551 | A1* | 6/2010 | Whynot | 707/610 |
| 2012/0030746 | A1* | 2/2012 | Sng et al. | 709/203 |
| 2012/0102221 | A1* | 4/2012 | Grieve | 709/238 |
| 2012/0117145 | A1* | 5/2012 | Clift et al. | 709/203 |

* cited by examiner

*Primary Examiner* — Philip B Tran
(74) *Attorney, Agent, or Firm* — James J. DeCarlo; Greenberg Traurig, LLP

(57) ABSTRACT

Disclosed is a fully push-based and scalable web application architecture unifying discrete and persistent web services. It houses a database slave on the web server machine to leverage the replication capabilities of common database systems. In doing so, the replication of data between a database master (located on a separate machine) and a slave (located on the web server machine) serves to prompt the web server software of any changes in the data, with which it may then generate an updated web service response to push to the relevant clients. Neither the clients nor the web servers ever need to blindly poll a data source for changes. Furthermore, data is transmitted in the same RESTful style using a persistent (i.e. WebSocket) connection as it would be using the corresponding discrete HTTP request.

15 Claims, 9 Drawing Sheets

SCALABLE PUSH-BASED ARCHITECTURE FOR WEB APPLICATIONS

FIELD

The present disclosure relates to web applications, and more specifically to a scalable push-based architecture for web applications.

BACKGROUND

The architecture used by large-scale web applications is ill-suited to serve clients in need of long-lived persistent connections. Traditionally, web content has been delivered via short-lived, discrete connections initiated exclusively by the client device. For real-time applications in which the client monitors web service data for changes over time, the industry standard has been to require the client to poll the web service intermittently. With the introduction of persistent connections in the browser (i.e., Web Sockets), data transmission can occur in real time, with changes communicated (i.e., pushed) by the web server to the client as they occur, rather than through polling on the client side. A push-based model significantly reduces the amount of data transmitted between client and web server, but it also requires that the web server know when changes occur in the data it is serving to the client. Large-scale web applications make this difficult because—for scale and availability—data is typically kept on database servers separate from the web servers with which the client interacts directly. Hence, when a request is made by a client device to a web server, the web server must similarly poll a database for the data required to respond to the client.

SUMMARY

This disclosure provides a fully push-based and scalable web application architecture unifying discrete and persistent web services. It houses a database slave on the web server machine to leverage the replication capabilities of common database systems. In doing so, the replication of data between a database master (located on a separate machine) and a slave (located on the web server machine) serves to prompt the web server software of any changes in the data, with which it may then generate an updated web service response to push to the relevant clients. Neither the clients nor the web servers ever need to blindly poll a data source for changes. Furthermore, data is transmitted in the same RESTful style using a persistent (i.e. Web Socket) connection as it would be using the corresponding discrete HTTP request.

In one aspect, a server computer receives, from a client computer in communication with the server computer, a request to update a web resource. The server computer writes the new data to a master database located external to the server computer. A slave database located on the server computer receives from the master database a replication message to update the same data in the slave database. In response to receiving the replication message, the web server will regenerate a response for its connected clients and transmit the response if it has changed.

In one embodiment, the server computer establishes a persistent connection with the client computer, such as via Web-Socket. In one embodiment, the web resource was previously transmitted by the server computer to the client computer. In one embodiment, a hash value is calculated on the web resource and stored in a cache on the web server before transmitting the web resource to the client computer. In one embodiment, the receiving of a request to update the web resource further includes receiving the new web resource sent from the client to the web server. In one embodiment, the server computer determines if a hash of the new web resource equals the web resource stored in the slave database. In one embodiment, the server computer sets the web resource stored in the slave database to a hash of the new web resource. In one embodiment, the new web resource is transmitted to a plurality of client computers listening for that web resource.

In one embodiment, the updating step represents a state-changing (e.g., POST, PUT, DELETE) HTTP command from the client computer.

In another aspect, a server computer receives from a client computer in communication with the server computer a request to read a web resource. The web resource is retrieved from a slave database located on the server computer and corresponding to a master database located external to the server computer. The server computer transmits the web resource to the client computer.

In one embodiment, the retrieving and transmitting steps represent a non-state-changing HTTP (e.g., GET, HEAD) request from the client computer. In one embodiment, a persistent connection is established with the client computer by the server computer.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
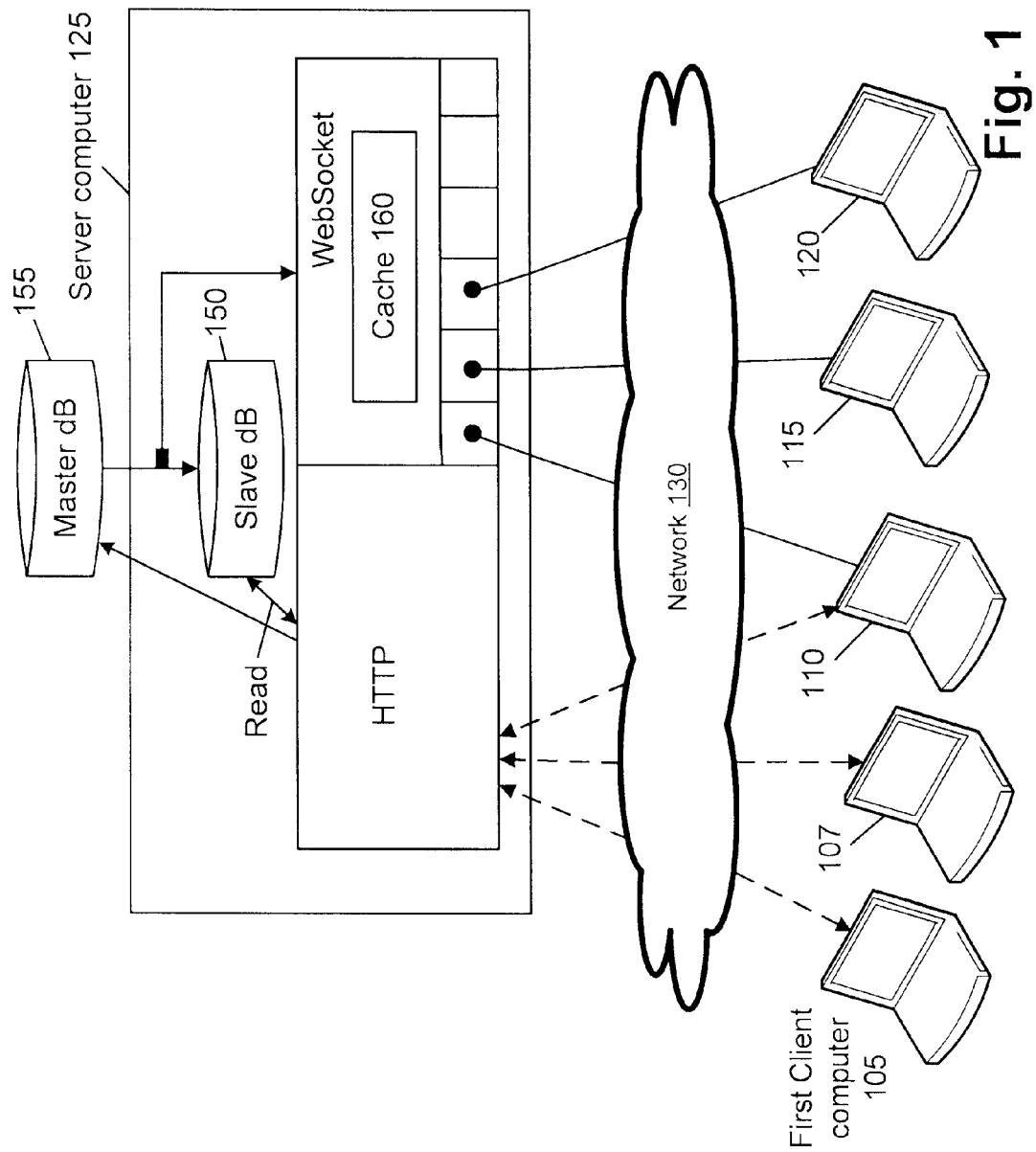
FIG. 1 is a block diagram of client computers communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Figure 2:
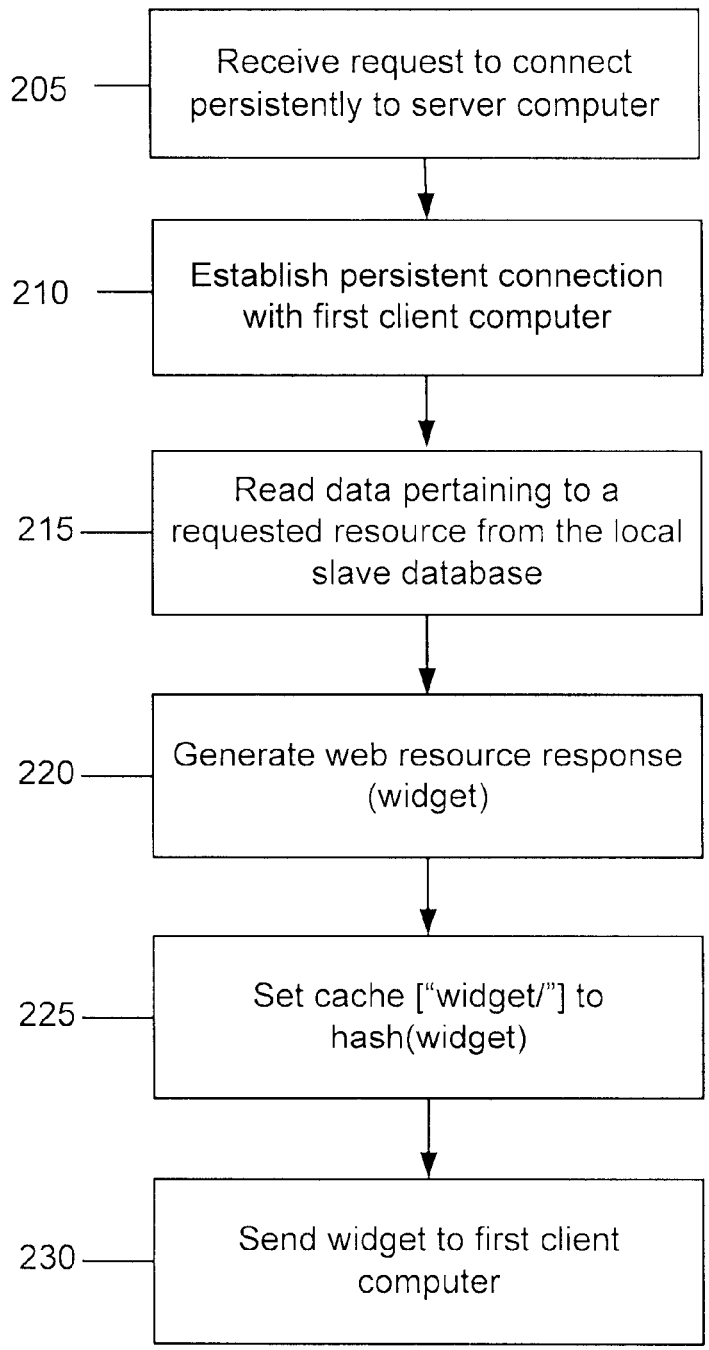
FIG. 2 is a flowchart illustrating steps performed by the server computer of FIG. 1 when receiving a request to read a web resource ("widget") in accordance with an embodiment of the present disclosure.

FIG. 1 is a block diagram of an embodiment of a plurality of client computers 105, 107, 110, 115, and 120 communicating with a server computer 125 (also referred to herein as a web server) over a network 130 such as the Internet. FIG. 2 is a flowchart illustrating an embodiment of steps performed by the server computer 125 when receiving a request to read a web resource called a "widget". In one embodiment, the server computer 125 receives a request from the first client computer 105 to establish a persistent connection with the server computer 125 (step 205). Although described below with respect to the first client computer 105, it should be noted that any of the client computers 107, 110, 115, 120 can perform the same steps.

In one embodiment, this request is a request to establish a WebSocket connection with the server computer 125. WebSocket is a technology providing for bi-directional, full duplex communication channels, over a single Transmission Control Protocol (TCP) socket. To establish a WebSocket connection, the first client computer 105 transmits a WebSocket handshake request to the server computer 125, and the server computer 125 sends a WebSocket handshake response to the first client computer 105. Once a WebSocket connection is established, data can be sent back and forth between the first client computer 105 and the server computer in full-duplex mode. The WebSocket protocol defines a ws:// and wss:// prefix to indicate a WebSocket and WebSocket Secure connection, respectively.

In step 210, a persistent connection (e.g., via the WebSocket protocol) is established between the first client computer 105 and the server computer 125. The server computer 125 reads the data pertaining to the requested resource from the local slave database 150 (step 215) to generate the web resource response (widget) (step 220). The server computer 125 stores a hash of the web resource response in a cache indexed by the resource identifier (e.g., cache ["widget/"]=hash(widget)) (step 225), and transmits the response to the first client computer 105 (step 230). The slave database 150 is in communication with a master database 155 externally located from the server computer 125.

Client computers 105, 107, 110, 115, and 120 are connected to the HTTP and WebSocket interfaces on the server computer 125. Persistent (WebSocket) clients are connected with solid lines, and discrete (HTTP) clients are connected with dashed lines. FIG. 1 illustrates how the two interfaces interact as part of a unified web service for both persistent and discrete connections.

In one embodiment, the server computer 125 reads the requested resource in response to a connection with the client computer 105. In another embodiment, the client computer 105 transmits an explicit read request to the server computer 125 instructing the server computer 125 to read the resource.

Figure 3:
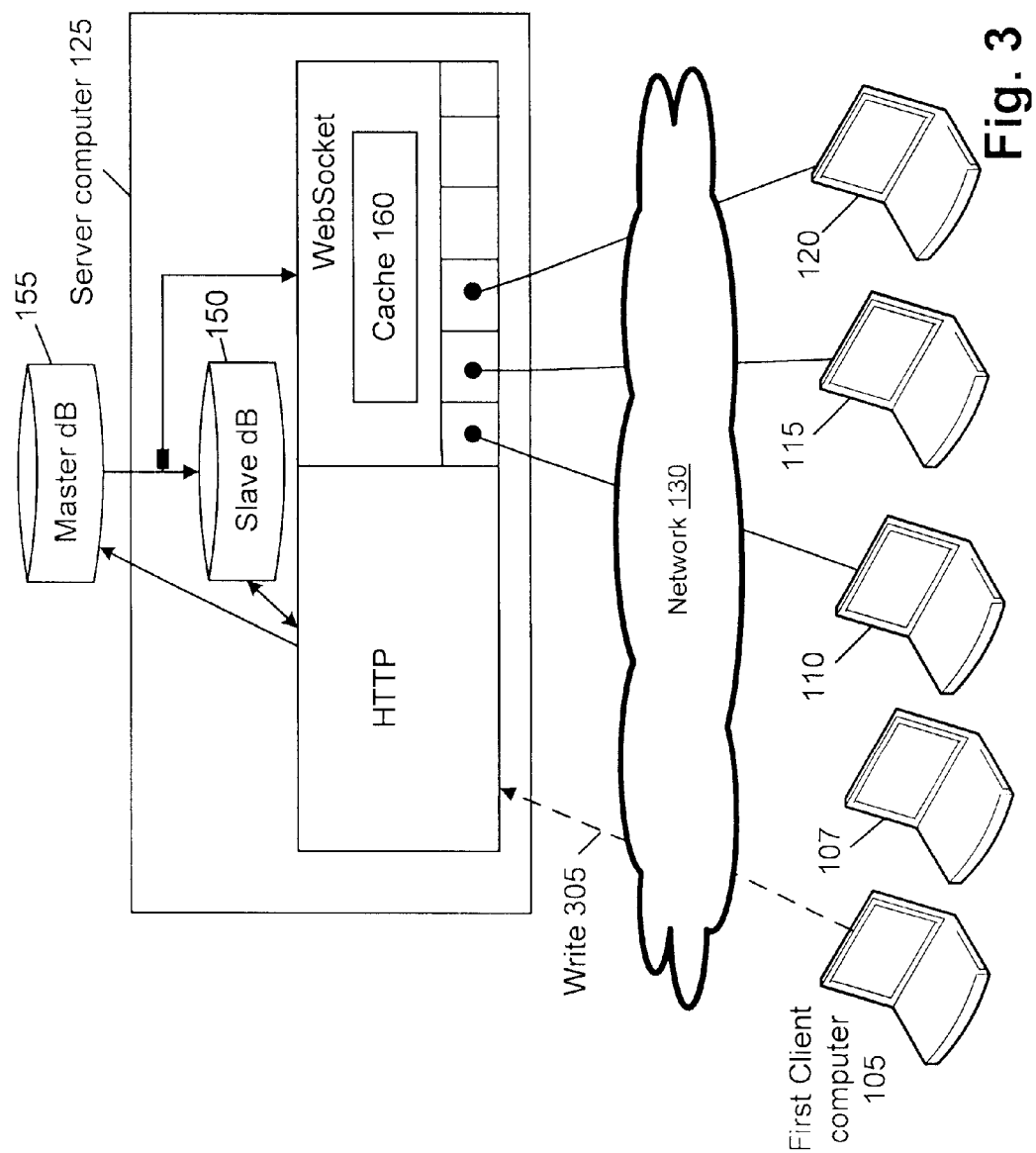
FIG. 3 illustrates a block diagram of the client computers in communication with the server computer when a Write request to a widget occurs in accordance with an embodiment of the present disclosure.
Figure 4:
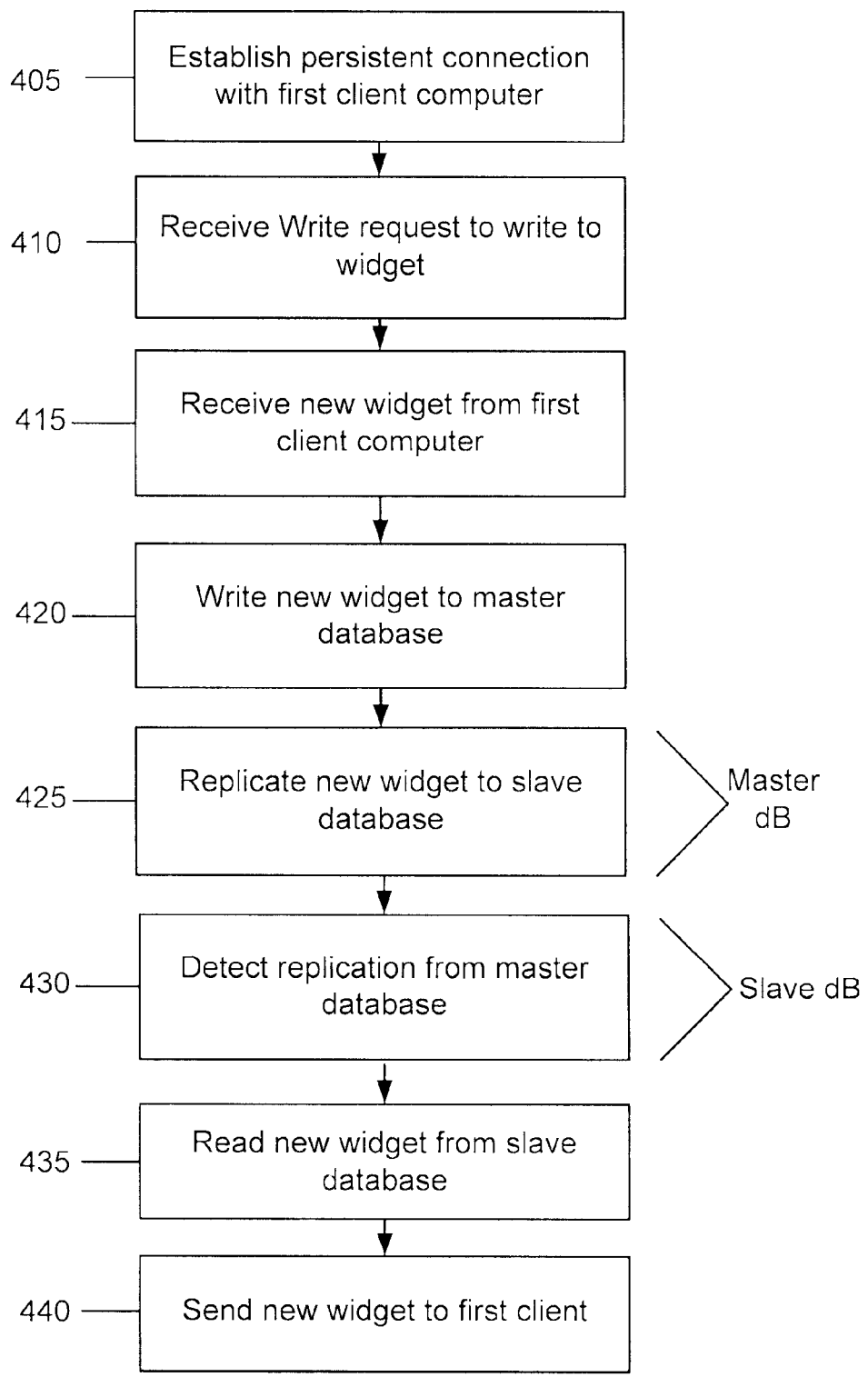
FIG. 4 is a flowchart illustrating steps performed by the server computer during a Write request in accordance with an embodiment of the present disclosure.

FIG. 3 illustrates a block diagram of the client computers 105, 107, 110, 115, 120 in communication with the server computer 125 when a Write request occurs. FIG. 4 is a flowchart illustrating the steps performed by the server computer 125 during this process. As described above, in one embodiment the server computer 125 receives a request to establish a persistent connection with the first client computer 105. The persistent connection is established in step 405. As described above, the server computer 125 reads the "widget" from its slave database 150. The server computer 125 sets its cache ["widget/"]=hash (widget) and sends the widget to the first client computer 105. The first client computer 105 receives the widget.

Figure 5:
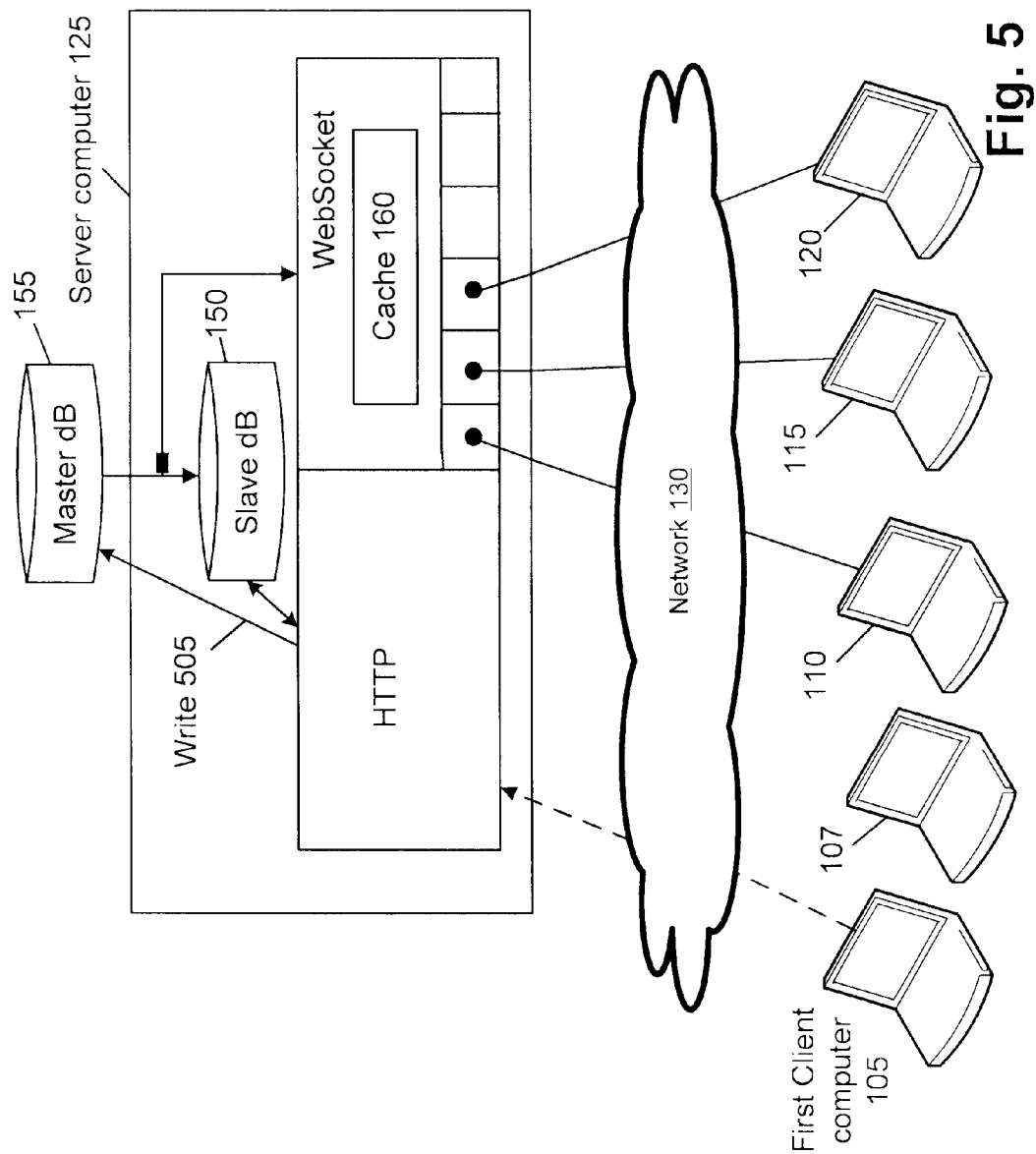
FIG. 5 is a block diagram of the server computer writing data pertaining to a new widget to a master database in accordance with an embodiment of the present disclosure.
Figure 6:
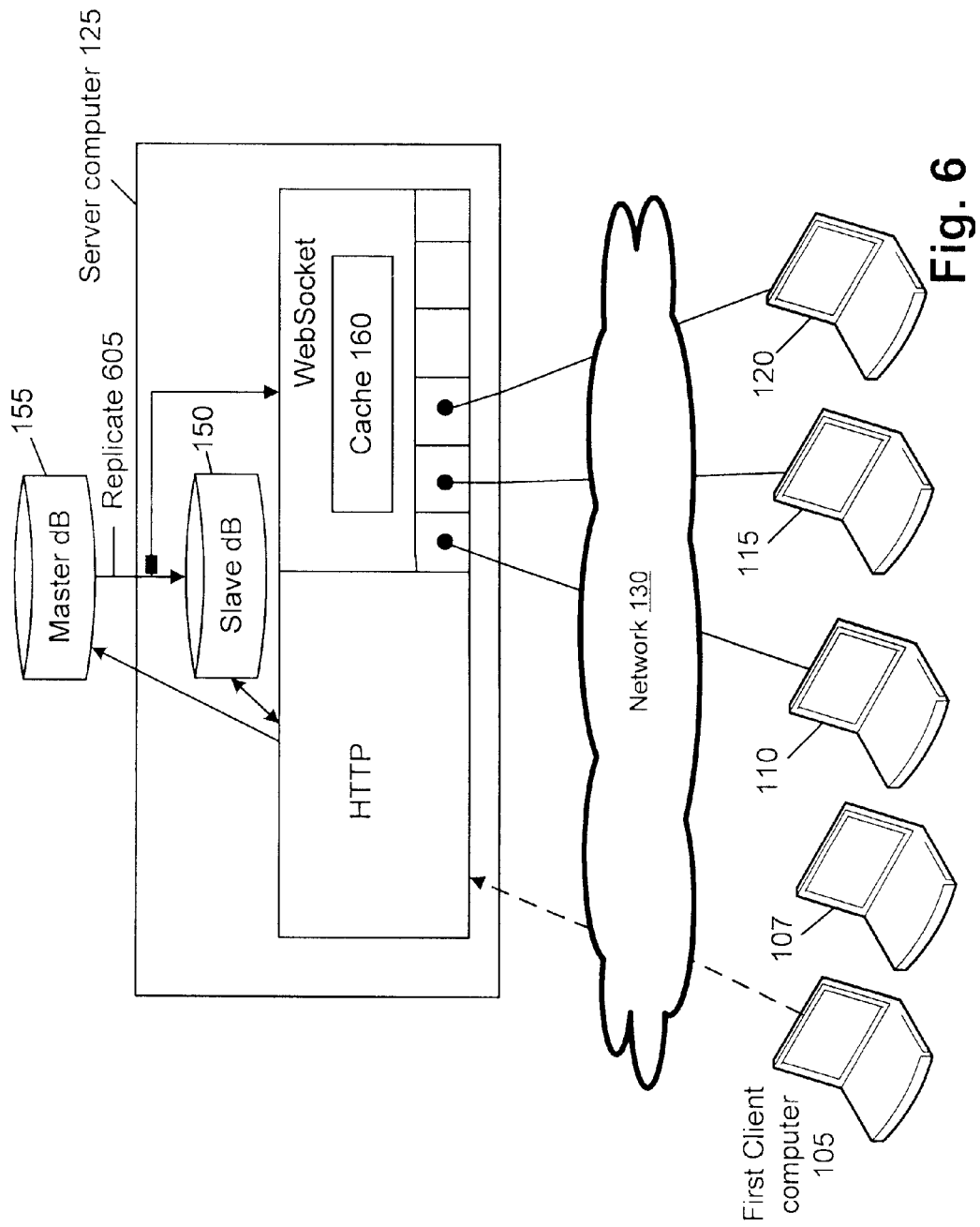
FIG. 6 is a block diagram of the master database of FIG. 5 replicating the new widget to a slave database in accordance with an embodiment of the present disclosure.
Figure 7:
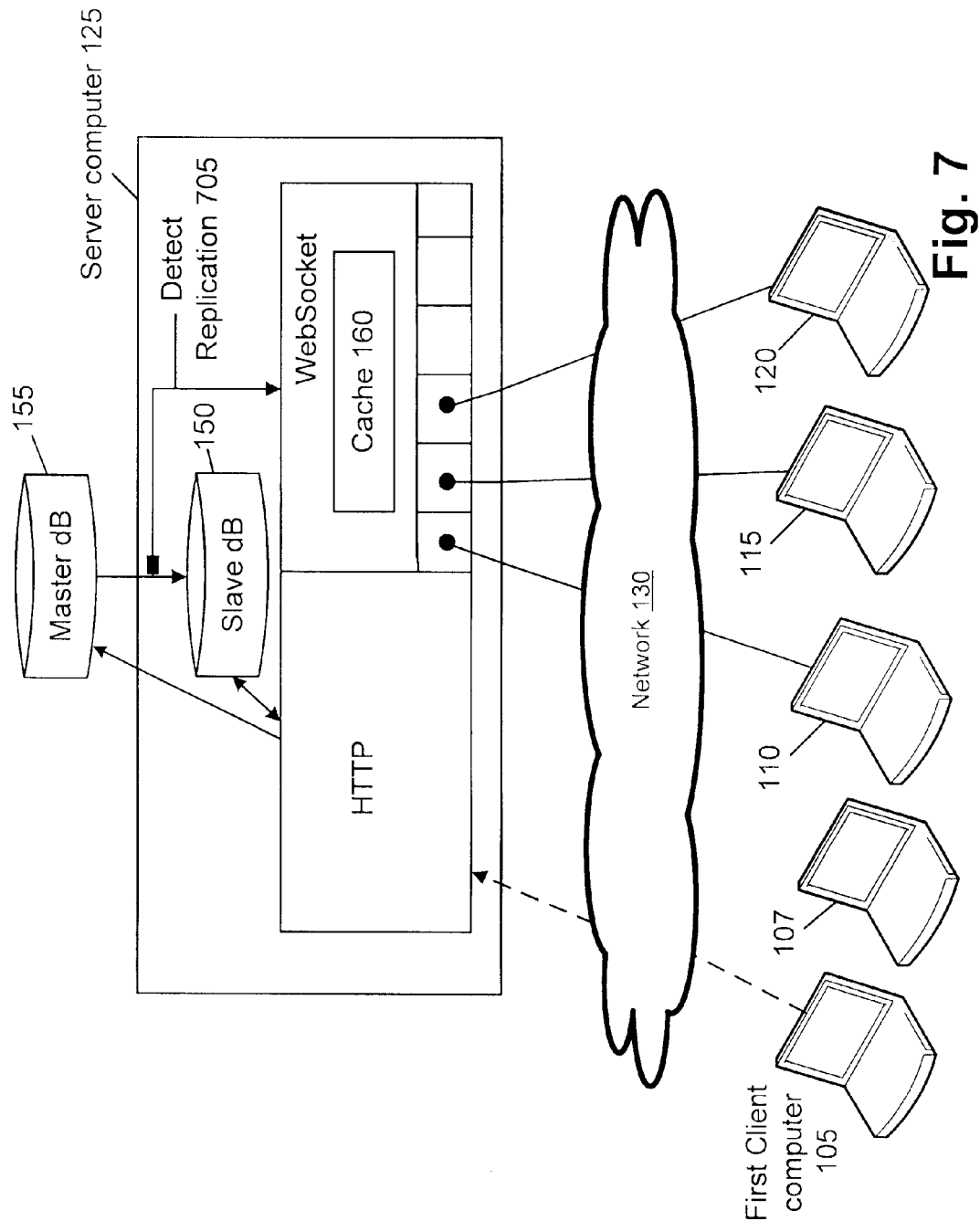
FIG. 7 is a block diagram of the server computer detecting the replication to the slave database in accordance with an embodiment of the present disclosure.
Figure 8:
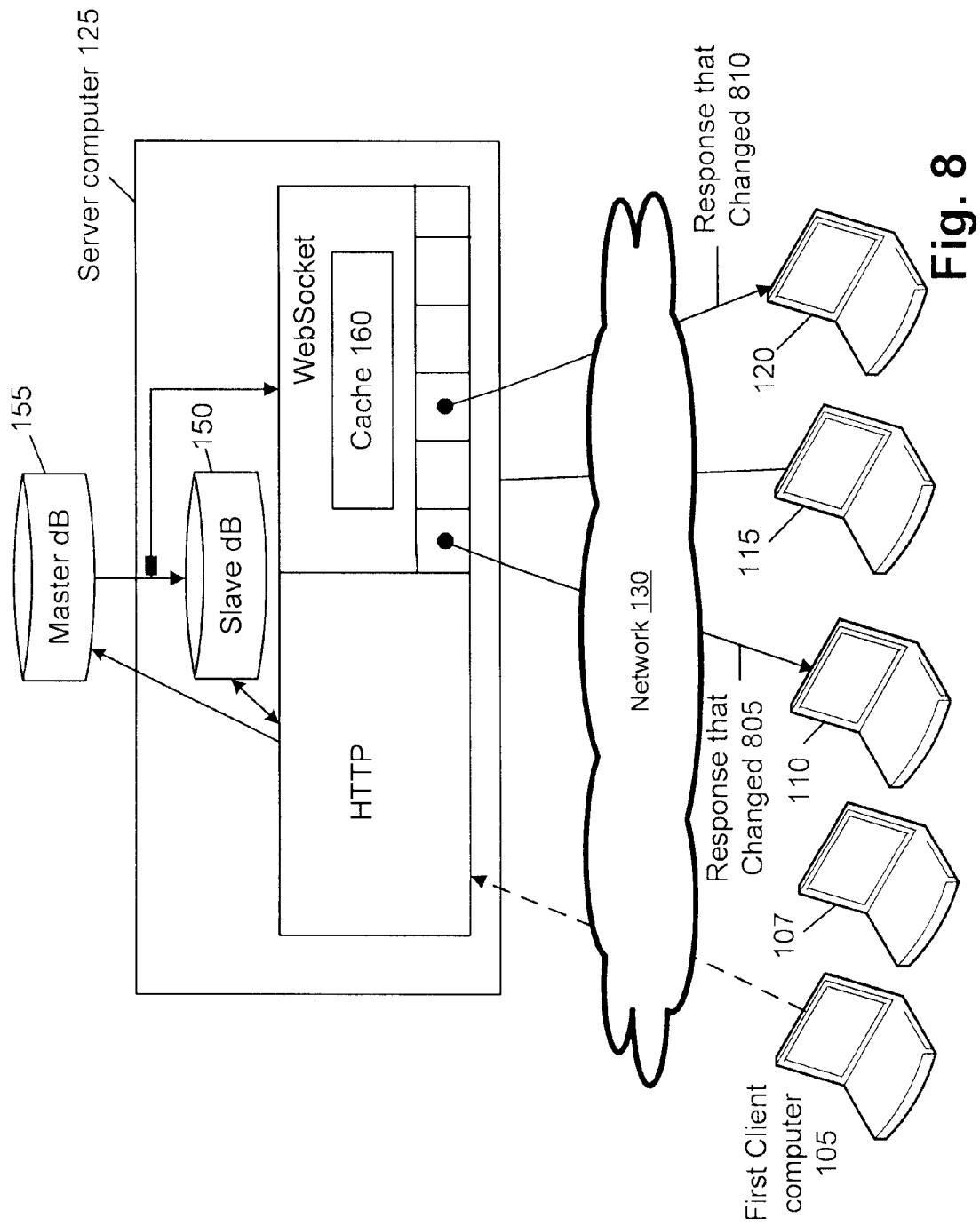
FIG. 8 is a block diagram of the server computer transmitting the new widget to each of the client computers that are listening for that widget in accordance with an embodiment of the present disclosure.

The first client computer 105 then transmits a Write request 305 to the server computer 125 to write to the web resource "widget". The server computer 125 receives the Write request and a new widget from the first client computer 105 (steps 410 and 415). The server computer 125 writes the new widget to its master database 155 (shown with arrow 505 in FIG. 5) (step 420). The master database 155 replicates the new widget to the slave database 150 (arrow 605 of FIG. 6) (step 425). In one embodiment, the master database 155 replicates the new widget to one or more other slave databases located on other server computers. The slave database 150 detects the replication (as shown with arrow 705 in FIG. 7) from the master database 155 (step 430). The server computer 125 then reads the new widget from the slave database 150 (step 435). If hash (new widget) does not equal cache ["widget/"], then the server computer 125 sets the cache ["widget/"]=hash (new widget). The server computer 125 then transmits the new widget to the first client computer 105 over the persistent connection (step 440). In one embodiment, the server computer 125 transmits the new widget to each of the client computers 105, 107, 110, 115, 120 that are listening for that widget (as shown with arrows 805, 810 of FIG. 8).

An embodiment of pseudocode of these procedures is set forth below:

```
Two clients (client1 and client2) connect persistently (via the ws://
protocol and associated port) to two web servers (www1 and www2). Each
web server houses a local slave database (accessible via the db:// protocol
and associated port), which receives a replication stream from a master
database host (masterdb). client1 only reads from the web service, while
client2 also writes. The write is issued to masterdb, from which
asynchronous database replication cascades a change back to both clients
while they are still connected.
client1:
    REQUEST CONNECT to ws://www1.yahoo.com/widget/
www1.yahoo.com:
    CONNECT to client1
    READ widget from db://www1.yahoo.com
    SET cache["widget/"] = hash(widget)
    SEND widget to client1
client1:
    RECEIVE widget
client2:
    REQUEST CONNECT to ws://www2.yahoo.com/widget/
www2.yahoo.com:
    CONNECT to client2
    READ widget from db://www2.yahoo.com
    SET cache["widget/"] = hash(widget)
    SEND widget to client2
client2:
    RECEIVE widget
    SEND new widget
www2.yahoo.com:
    RECEIVE new widget
    WRITE new widget to db://masterdb.yahoo.com
masterdb.yahoo.com:
    REPLICATE new widget to db://www1.yahoo.com
    REPLICATE new widget to db://www2.yahoo.com
www1.yahoo.com:
    DETECT REPLICATION from masterdb.yahoo.com
    READ new widget from db://www1.yahoo.com
    IF hash(new widget) != cache["widget/"]:
        SET cache["widget/"] = hash(new widget)
        SEND new widget to client1
client1:
    RECEIVE new widget
www2.yahoo.com:
    DETECT REPLICATION from masterdb.yahoo.com
    READ new widget from db://www2.yahoo.com
    IF hash(new widget) != cache["widget/"]:
        SET cache["widget/"] = hash(new widget)
        SEND new widget to client2
client2:
    RECEIVE new widget
```

As can be seen with the following commands identified above:

```
READ new widget from db://www1.yahoo.com
IF hash(new widget) != cache["widget/"]:
    SET cache["widget/"] = hash(new widget)
    SEND new widget to client1
``` this is a revalidating on the web server after the web server receives a replication message from the master database. Thus, the web server queries the local database again for each resource its Web Socket clients are listening to (in the above case, just "widget/") and determines if the content of that resource has changed since it was last sent to the client computer (by comparing it with a hash of the previous content, which it stored in its cache). If it is changed, the server computer transmits the new content to each client computer listening to the resource.

Housing a slave database 150 on the server computer 125 (or, conversely, placing the web server software on the database slave machine) to leverage the replication capabilities of the database system provides a fully push-based, scalable web application solution. The web application "listens" for triggers from the database master 155 to revalidate requests from clients that are connected persistently to the server computer 125. This configuration also offers a unifying model for discrete and persistent web services.

Within this model, activities on persistent connections (e.g., WebSocket connections, which begin with an HTTP handshake) map to certain conventional HTTP operations. A WebSocket connection to a URI in this case represents a persistent GET request, where the client receives updates to the state of the resource as they happen. Meanwhile, a client may write to the WebSocket (potentially restricted, as with any HTTP transaction, by its cookie headers or other session information at connection time), in which case a POST is performed on the resource. Though a client computer cannot delete a given resource while it is connected persistently to the resource, a discrete HTTP DELETE on that resource would effectively disconnect any other client computers which are. By submitting a discrete HTTP GET request to the deleted resource, those clients could then discover (via a conventional HTTP response code) that the resource had been deleted or no longer exists. Thus, a custom protocol within WebSockets is not needed when both WebSockets and regular discrete HTTP are available on the client side. This also unifies the model for development of both discrete and persistent web services.

The messages transmitted between the client computer 105 and the server computer 125 are format-agnostic, so the content of the message (whether in an HTTP POST or as a write to the socket) can be XML, JSON, comma-separated values, hex-encoded binary, or anything else. In one embodiment, the format depends on the format imposed by the server computer 125. However, for a given resource (e.g., websocket/), if a server allows the client computer to write to the resource, the write issued by the client computer should be the same format and conform to the same schema (if applicable) of the content that the server would send to the client on a read request.

For example, the resource at www1.yahoo.com/widget/ could be the following XML document sent to the client on a read request:

```
<widget>
    <name>foo</name>
</widget>
```

If the client computer was authorized to write to that resource, the client computer could either write (to an open websocket) or issue an HTTP POST with the new widget:

```
<widget>
    <name>new foo</name>
</widget>
```

The server computer would validate the content of the client computer's request as an XML document conforming to its "widget" schema and make the change.

For example, a Representational State Transfer (REST) web service can be a directory of people. The web service model would, in one embodiment, look like the following:

```
people/
people/<id>/
people/<id>/name/
```

-continued

```
people/<id>/phone/
people/<id>/email/
```

Getting the topmost URL from a web server could return the following data in XML:

```
<people>
    <person>
        <id>1</id>
        <name>Joe</name>
        <phone>555-1234</phone>
        <email>joe@acme.com</email>
    </person>
    <person>
        <id>2</id>
        <name>Mary</name>
        <phone>555-1235</phone>
        <email>mary@acme.com</email>
    </person>
</people>
```

One could then plug joe's id into the second URL (GET/people/1/) to get just his information:

```
<person>
    <id>1</id>
    <name>Joe</name>
    <phone>555-1234</phone>
    <email>joe@acme.com</email>
</person>
```

Figure 9:
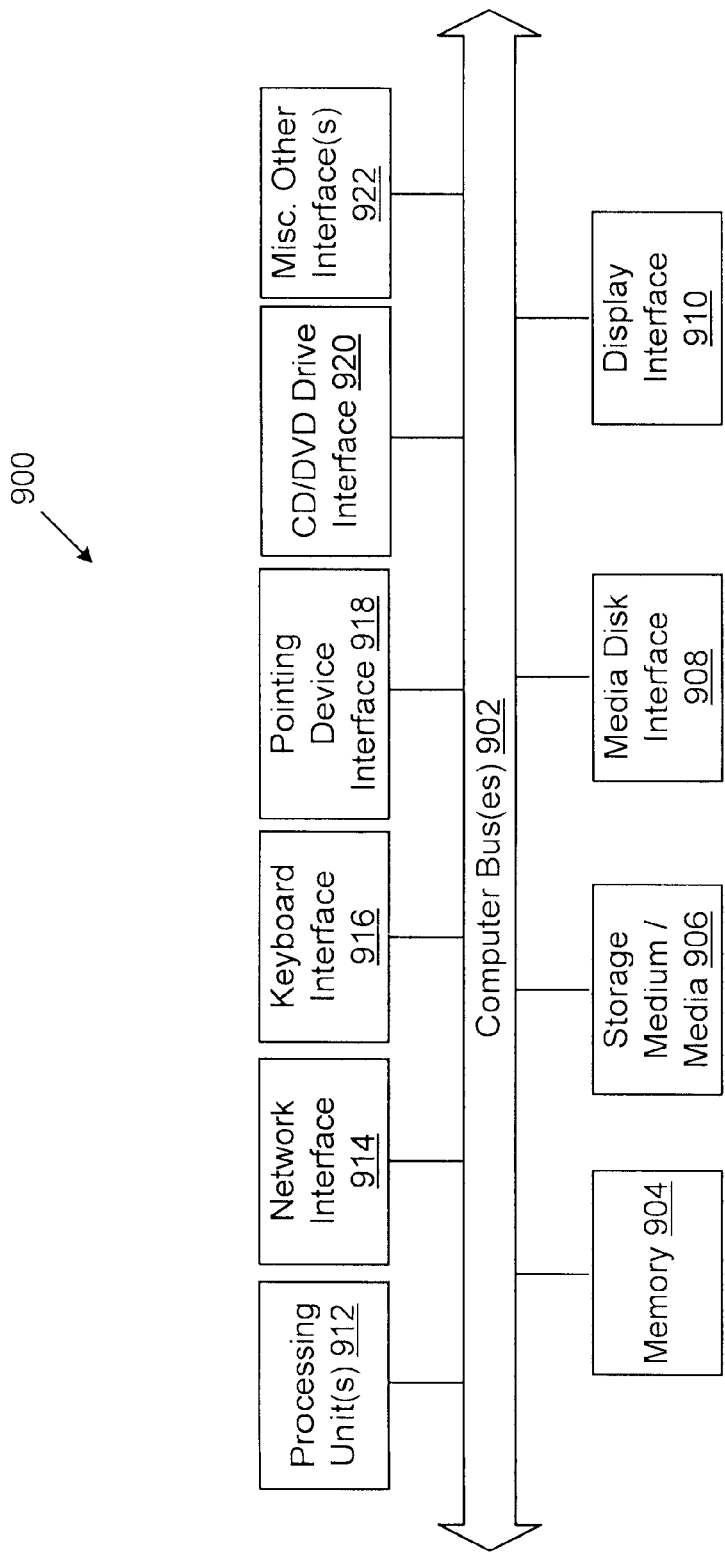
FIG. 9 is a block diagram illustrating an internal architecture of a computing device in accordance with an embodiment of the present disclosure.

FIG. 9 is a block diagram illustrating an internal architecture of an example of a computing device, such as server computer 125 and/or client computer 105, in accordance with one or more embodiments of the present disclosure. A computer as referred to herein refers to any device with a processor capable of executing logic or coded instructions, and could be a server, personal computer, set top box, smart phone, pad computer or media device, to name a few such devices. As shown in the example of FIG. 9, internal architecture 900 includes one or more processing units (also referred to herein as CPUs) 912, which interface with at least one computer bus 902. Also interfacing with computer bus 902 are persistent storage medium/media 906, network interface 914, memory 904, e.g., random access memory (RAM), run-time transient memory, read only memory (ROM), etc., media disk drive interface 908 as an interface for a drive that can read and/or write to media including removable media such as floppy, CD-ROM, DVD, etc. media, display interface 910 as interface for a monitor or other display device, keyboard interface 916 as interface for a keyboard, pointing device interface 918 as an interface for a mouse or other pointing device, and miscellaneous other interfaces not shown individually, such as parallel and serial port interfaces, a universal serial bus (USB) interface, and the like.

Memory 904 interfaces with computer bus 902 so as to provide information stored in memory 904 to CPU 912 during execution of software programs such as an operating system, application programs, device drivers, and software modules that comprise program code, and/or computer-executable process steps, incorporating functionality described herein, e.g., one or more of process flows described herein. CPU 912 first loads computer-executable process steps from storage, e.g., memory 904, storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage medium/media 906 is a computer readable storage medium(s) that can be used to store software and data, e.g., an operating system and one or more application programs. Persistent storage medium/media 906 can also be used to store device drivers, such as one or more of a digital camera driver, monitor driver, printer driver, scanner driver, or other device drivers, web pages, content files, playlists and other files. Persistent storage medium/media 906 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving, by a server computer from a client computer, a request to update a web resource previously transmitted by the server computer to the client computer, the receiving a request to update the web resource further comprises receiving a new web resource from the client computer;
transmitting, by the server computer, the request to a master database located external to the server computer;
receiving, on a slave database located on the server computer and from the master database, a replication message associated with the request to update the web resource;
in response to receiving the request to update the web resource, updating, by the slave database, the web resource with the update;
transmitting, by the server computer to the client computer, the web resource with the update; and
determining, by the server computer, if a hash of the new web resource equals a hash of the transmitted web resource.

2. The method of claim 1 wherein the receiving a request to update a web resource comprises establishing, by the server computer, a persistent connection with the client computer.

3. The method of claim 2 wherein the persistent connection is a connection via WebSocket.

4. The method of claim 1 further comprising storing a hash of the web resource before transmitting the web resource to the client computer.

5. The method of claim 1 wherein the updating step represents a state-changing HTTP command from the client computer.

6. The method of claim 1 wherein the updating step represents a WebSocket write from the client computer.

7. A method comprising:
receiving, by a server computer from a client computer, a request to update a web resource previously transmitted by the server computer to the client computer, the receiving a request to update the web resource further comprises receiving a new web resource from the client computer;
transmitting, by the server computer, the request to a master database located external to the server computer;
receiving, on a slave database located on the server computer and from the master database, a replication message associated with the request to update the web resource;
in response to receiving the request to update the web resource, updating, by the slave database, the web resource with the update;
transmitting, by the server computer to the client computer, the web resource with the update;
determining, by the server computer, if a hash of the new web resource equals a hash of the transmitted web resource; and
transmitting, by the server computer, the new web resource to a plurality of client computers listening for that web resource.

8. A method comprising:
receiving, by a server computer from a client computer in communication with the server computer, a request to read a web resource, the receiving a request to read the web resource further comprises receiving a new web resource from the client computer;
retrieving, from a slave database located on the server computer, the web resource, the slave database corresponding to a master database located external to the server computer, and the slave database configured to receive updates from the master database;
transmitting, by the server computer to the client computer, the web resource; and
determining, by the server computer, if a hash of the new web resource equals a hash of the transmitted web resource.

9. The method of claim 8 wherein the retrieving and transmitting steps represent a non-state-changing HTTP request from the client computer.

10. The method of claim 8 wherein the receiving a request to read a web resource comprises establishing, by the server computer, a persistent connection with the client computer.

11. A server computer comprising:
a hardware processor;
a non-transitory computer readable storage medium storing thereon program logic for execution by the processor, the stored program logic comprising:
receiving logic executed by the processor for receiving, from a client computer, a request to update a web resource previously transmitted by the server computer to the client computer, the receiving a request to update the web resource further comprises receiving a new web resource from the client computer;
request transmitting logic executed by the processor for transmitting the request to a master database located external to the server computer;
slave database logic executed by the processor for executing a slave database located on the server computer for receiving from the master database a replication message associated with the request to update the web resource and for updating the web resource with the update;
web resource transmitting logic executed by the processor for transmitting, to the client computer, the web resource with the update; and
determining logic executed by the processor for determining if a hash of the new web resource equals a hash of the transmitted web resource.

12. The server computer of claim 11 wherein the receiving logic for receiving a request to update a web resource comprises connection establishing logic executed by the processor for establishing a persistent connection with the client computer.

13. The server computer of claim 12 wherein the persistent connection is a connection via WebSocket.

14. A non-transitory computer readable storage medium tangibly storing thereon computer program instructions capable of being executed by a computer processor of a server computer, the computer program instructions defining the steps of:

receiving, by the server computer from a client computer in communication with the server computer, a request to update a web resource previously transmitted by the server computer to the client computer, the receiving a request further comprises receiving a new web resource from the client computer;

transmitting, by the server computer, the request to a master database located external to the server computer;

receiving, on a slave database located on the server computer and from the master database, a replication message associated with the request to update the web resource;

in response to receiving the request to update the web resource, updating, by the slave database, the web resource with the update;

transmitting, by the server computer to the client computer, the web resource with the update; and determining, by the server computer, if a hash of the new web resource equals a hash of the transmitted web resource.

15. The non-transitory computer readable storage medium of claim 14 wherein the receiving a request to update a web resource comprises establishing a persistent connection between the server computer and the client computer.

* * * * *